Nov. 15, 1966
W. R. BRADLEY
3,285,968
METHOD FOR CONTINUOUSLY PRODUCING CALCIUM ALKOXY ALCOHOLATES
Filed Nov. 23, 1962
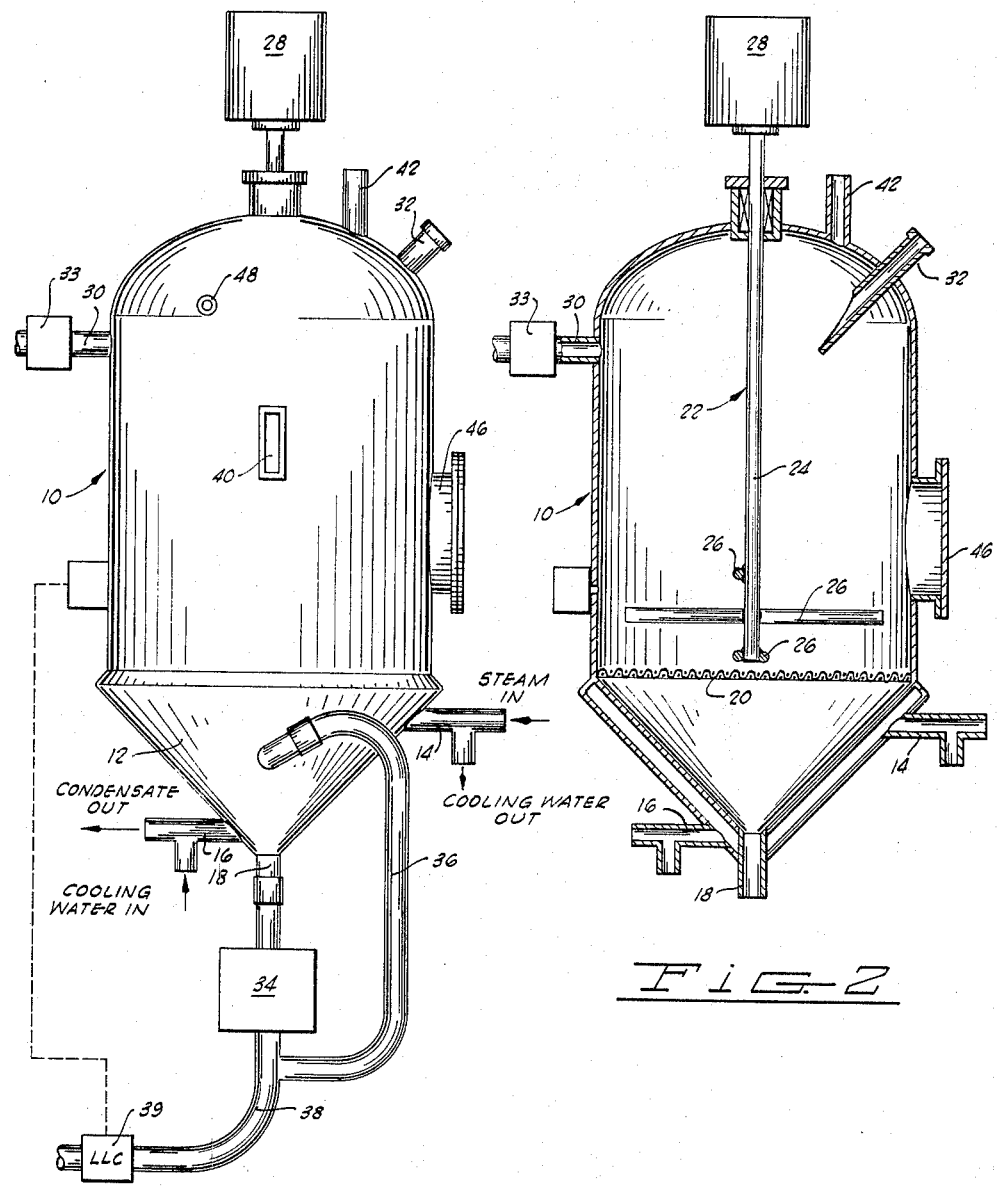
INVENTOR.
WILLIAM R. BRADLEY
BY
Baylen E. Rutherford, Jr.
AGENT

United States Patent Office 3,285,968
Patented Nov. 15, 1966

3,285,968
METHOD FOR CONTINUOUSLY PRODUCING CALCIUM ALKOXY ALCOHOLATES
William R. Bradley, Ponca City, Okla., assignor to Continental Oil Company, Ponca City, Okla., a corporation of Oklahoma
Filed Nov. 23, 1962, Ser. No. 239,436
7 Claims. (Cl. 260—615)

This invention relates to a method and apparatus for continuously producing calcium alkoxy alcoholates by reacting calcium carbide with a glycol ether. More particularly, but not by way of limitation, the present invention relates to a process and apparatus by which a glycol ether and calcium carbide may be economically reacted to commercially produce calcium alkoxy alcoholate in a relatively short reaction time.

Certain calcium alkoxy alcoholate compounds constitute valuable intermediate compounds utilized in producing lubricating oil additives. These materials may be produced by reacting a glycol ether, such as those having the structural formulas $$ROCH_2CH_2OH \text{ and } R'OCH_2CH_2OCH_2CH_2OH$$

where R is an alkyl group containing from 1 to 6 carbon atoms, and R' is an alkyl group containing from 1 to 4 carbon atoms with calcium carbide according to the reactions (1) $2ROCH_2CH_2OH + CaC_2 \rightarrow$
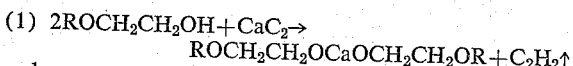
and (2) $2R'OCH_2CH_2OCH_2CH_2OH + CaC_2 \rightarrow$
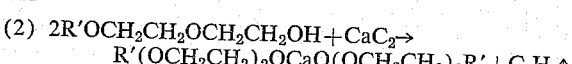

The described reactions are exothermic ones and proceed without the necessity for external heating or cooling. For example, one of the more commonly utilized glycol ethers which is employed in the reaction is that which is sold under the trademark methyl Cellosolve and which has the formula $CH_3OCH_2CH_2OH$. The reaction of methyl Cellosolve with the calcium carbide to yield calcium methoxy ethanolate and acetylene proceeds easily at 260° F. at atmospheric pressure.

Since the pure calcium alkoxy alcoholate compounds are generally solid, semi-solid or gelatinous materials, an excess of the glycol ether is generally employed in the reaction mixture, and being unreacted, acts as a diluent solvent for the product material. Thus, the product, in solution in the excess glycol ether, may be pumped and more easily handled in general. A product solution which contains from about 1 percent to about 15 percent by weight of calcium is satisfactory and is easily pumpable, although a solution containing from 7 percent to 10 percent calcium is preferred. In the case of the 2-methoxy ethanol (methyl Cellosolve) reaction, solutions of the former range of calcium concentration may be produced by using in the reaction mixture, from about 26.5 times the stoichiometric requirement of the glycol ether (to produce the 1 percent by weight calcium product solution) to about 1.8 times the stoichiometric glycol ether requirement (in order to produce a product solution containing about 15 percent by weight calcium.) Using about 3.8 times the stoichiometric requirement of glycol ether in the reaction will produce a solution of product containing about 7 percent calcium, whereas the 10 percent calcium containing solution is produced by using about 2.6 times the stoichiometric requirement of glycol ether.

In the production of calcium alkoxy alcoholates by the described reaction, several problems arise which seriously reduce the economic attractiveness of producing these products on a commercial basis. In the first place, commercial calcium carbide is available only in purities up to about 80 percent. The remainder of the commercially available composition is predominantly calcium oxide. Thus, the product remaining in the reaction vessel upon completion of the reaction must be filtered to remove therefrom the calcium oxide impurity and this fact, coupled with other factors associated with performing the reaction as a batch process, substantially increases production costs.

Also, reaction of the glycol ether and the calcium carbide in stoichiometric quantities proceeds extremely slowly, and in order to expedite the reaction time, a considerable excess of the carbide must be utilized. In other words, the reaction time required to completely react a given quantity of the glycol ether with a stoichiometric amount of calcium carbide is inversely proportional to the amount of excess carbide present. To reduce this reaction time to a reasonable one, say, of from 15 to 20 minutes, 10 theories of the carbide must be present in contact with the glycol ether when the reaction is carried out at about 220° F. If the number of theories of carbide are reduced without increasing the residence time of the materials in the reaction zone, or if the residence time is decreased without increasing the number of theories of carbide in contact with the glycol ether, the result is an uneconomic waste of calcium carbide per unit yield of product. In other words, the pellets of solid calcium carbide making up the stoichiometric quantity to be reacted will not be completely reacted, but will be "chewed up" or reduced to a partially reacted mush, will pass out of the reactor with the product stream, and will present serious product purification problems.

If it be undertaken to produce the calcium alkoxy alcoholate compounds by the described reaction utilizing a batch process, a huge reactor is required in order to accommodate the reactants for a reasonable plant capacity. Moreover, if it is undertaken to reduce the total quantity of reactants present by reducing the ratio of carbide to glycol ether to the point where stoichiometric quantities of the reactants are employed, a residence time of 24 hours is required for the completion of the reaction and, considering this residence time and the fact that only stoichiometric quantities of the reactants are utilized, the reactor size must hold 20,000 gallons for a reasonable plant capacity. Moreover, at the time the batch reaction is completed, large quantities of lime (CaO) remain in the product as impurity derived from the commercial calcium carbide utilized and present a substantial disposal problem because of the large amounts of product and impurity which must be handled in the relatively short transfer time available between batches.

The present invention constitutes an improvement in the process of preparing calcium alkoxy alcoholates by reacting a glycol ether with calcium carbide. In an overall sense, the improvement resides primarily in the economy with which the process may be practiced. The economic improvement in turn results from the ability through the use of the process of the invention to obtain good yields of relatively pure product in a reasonable reaction time without excessive carbide waste and using a reaction vessel which may be considerably smaller than those which have heretofore been required for commercial production of the alcoholates.

In a broad sense, the invention comprises a continuous, as opposed to a batch, process in which the calcium carbide and the glycol ether to be reacted are introduced continuously to a reaction zone and product is withdrawn from said zone. In one aspect of the invention the reactants are fed onto a fixed bed of calcium carbide which bed is constantly agitated to assure uniform and complete consumption of the calcium carbide therein and gradual and uniform release of the calcium oxide impurity contained in the carbide. The product alcoholate as formed is removed from the fixed bed.

As has previously been indicated, the time which is required to react a stoichiometric quantity of glycol ether with calcium carbide is inversely proportional to the amount by which the carbide present exceeds stoichiometric requirements. This time of reaction may be equated to the residence time of the liquid glycol ether in contact with a fixed bed of carbide, a time which is in turn directly proportional to the residence time of the glycol ether in a reaction vessel containing the carbide.

Before proceeding further in describing my invention, it may be well at this time to describe some of the process conditions. With regard to the temperature in the reaction zone, a suitable temperature is in the range of about 160° F. to about 260° F., with a preferred temperature being in the range of about 200° F. to about 220° F. The residence time is suitably in the range of about 5 minutes to about 100 minutes; preferably it is in the range of about 15 minutes to about 30 minutes. The amount of excess calcium carbide used in the bed is suitably in the range of about 2 to about 15 theories; preferably the excess calcium carbide is in the range of about 5 to about 10 theories. The term "theory" as used herein refers to that amount of calcium carbide consumed in the reaction of calcium carbide and glycol ether to provide a solution of calcium alkoxy alkoxide in glycol ether containing a specified quantity of calcium.

The glycol ether is passed through the reaction zone at a rate such that between about 3.8 percent and 55.5 percent of the glycol ether is reacted with the carbide whereby an alcoholate product solution containing between 1.0 percent and 15.0 percent by weight of calcium is produced. Preferably, the glycol ether is passed through the reaction zone at a rate such that between about 26.3 percent and 38.5 percent of the glycol ether is reacted with the carbide whereby an alcoholate product solution containing between 7 percent and 10 percent by weight of calcium is produced.

By carrying out the reaction in the method of this invention, the size of the reaction vessel which is employed may be made substantially smaller than that which is required to carry out the reaction as a batch process. Moreover, the conversion of calcium carbide to product is about 99 percent and therefore represents an improvement over that which is usually experienced in batch runs in which the extremely long reaction time required with a reasonably sized reactor must be cut short with the resultant inefficient carbide utilization.

Two further important features of the novel apparatus which is utilized in carrying out the process of the invention provide the advantage of reducing the size and expense of the filtration equipment which is required to remove the calcium oxide impurity from the calcium alkoxy alcoholate stream. The first of these is the provision of a slowly revolving stirrer positioned just above the screen which supports the fixed bed of carbide in the reaction vessel. The exact manner in which stirring of the carbide bed improves the evenness with which the reaction proceeds and the degree of carbide utilization, and also avoids intermittent accumulations of excessive calcium oxide in the product stream is not well understood. It is hypothesized, however, that slow agitation of the bed causes the soft carbide centers of the solid particles of carbide to be initially reacted and the outer shells of the particles containing the calcium oxide impurity to be reacted last. In any event, the hard carbide shells are maintained in substantially their original geometric dimension until most of the carbide therein has reacted and are thus prevented from passing through the screen and into the product stream until most of the carbide in the particle has been converted to product. The impurities of the carbide consisting predominantly of calcium oxide, are held up in the shells and are prevented from passing through the screen until after the major portion of the carbide particle has been consumed in the reaction. Also, unreacted carbide seems to be held up in the shells until it has been exposed to the glycol ether and reacted therewith.

The second feature of the apparatus which aids in preventing blocking of product discharge lines from the reactor and downstream filtering equipment is the provision of a recycle line or conduit. Through this conduit, about four times the net make of product is generally recycled into the reaction vessel below the fixed carbide bed and above the product discharge outlet. By increasing the total output from the reactor in this way, plugging caused by the solid lime in the product stream is minimized.

From the foregoing description of the invention, it will have become apparent that a broad object of this invention is to provide an improved process for producing calcium alkoxy alcoholates by reacting calcium carbide with a glycol ether.

A more specific object of the invention is to provide apparatus in which calcium carbide may be continuously reacted with a glycol ether in commercial quantities and on a relatively more economic basis than has heretofore been possible.

Another object of the invention is to reduce the size of the reactor and the reaction time required to produce a given quantity of calcium alkoxy alcoholate with maximum reaction efficiency.

Other objects and advantages of the invention will become apparent upon reading the following detailed description of the invention, in conjunction with a perusal of the accompanying drawings which illustrate the invention.

In the drawings:

FIGURE 1 is a view in elevation of one embodiment of the novel apparatus which may be employed in practicing the invention.

FIGURE 2 is a vertical sectional view taken through the center of the reaction vessel illustrated in FIGURE 1.

Referring now to the drawings in detail, reference character 10 designates generally a vertical reaction vessel, which is cylindrical over a major portion of its length and is provided with an inverted conical portion 12 at its lower end. The inverted conical portion 12 of the reaction vessel 10 is double-walled so that steam and cooling water may be circulated therein via conduits 14 and 16. Product from the reaction vessel 10 is discharged through a suitable discharge conduit 18 which passes through the double-walled conical portion 12 at the apex or lower end thereof.

At the point of intersection of the conical portion 12 of the reaction vessel 10 with the cylindrical portion thereof, the reaction vessel is partioned by a horizontal screen 20. The mesh size of the horizontal screen is dictated by the size of the calcium carbide particles utilized in the process, since the primary requisite pertaining to the size of the screen openings is that they be small enough to prevent passage therethrough of substantially all of the carbide particles, or, as previously explained, the calcium oxide shells. For example, when using 1/4 inch by 1/12 inch commercial grade calcium carbide, a 30 mesh bar screen has been very satisfactorily employed.

A stirrer designated generally by reference character 22 is positioned immediately above the screen 20 in the cylindrical portion of the reaction vessel 10. In the illustrated embodiment of the invention, the stirrer 22 comprises an elongated shaft 24 which has welded or otherwise suitably secured thereto a plurality of horizontally extending bars 26. The shaft 24 passes through the top of the reaction vessel 10 and is driven by a suitable motor 28. The bottom of the shaft 24 and the lowermost bar 26 thereon should be spaced far enough above the screen 20 to avoid pressing or wiping the particles of carbide through the screen by compression.

For the purpose of admitting glycol ether and calcium carbide continuously to the reaction vessel 10, the inlets, 30 and 32, respectively, are provided in the top of the vessel. A suitable pre-heating device 33 is placed in the glycol inlet conduit.

The product discharge conduit 18 is connected to a pump 34 which transports the net make product stream and the recycle stream. The recycle stream is returned to a point just below the screen 20 in the conical portion 12 of the reaction vessel 10 via the recycle conduit 36. The net make product stream is delivered by a conduit 38 from the pump 34 through a liquid level control device 39 and ultimately to a filtering device (not shown) where the solid calcium oxide impurity is removed. The liquid level controller 39 functions to control the rate at which both the net make of product and the recycled product are withdrawn from the reactor.

In addition to the above described elements of the apparatus used in practicing the process of the invention, the reaction vessel 10 is provided with other appurtenances which are conventional and their construction and use well understood in the art, such as a sight glass 40, a conduit 42 for releasing acetylene gas produced in the reaction, a manway 46, and a pressure gauge connection 48.

Having described the novel apparatus of the present invention, the manner in which the apparatus is utilized in practicing the process of the invention will next be described. At the outset of the process, a calculated amount of solid calcium carbide is placed upon the screen 20. The amount of carbide placed in the fixed bed is determined in the manner hereinbefore explained—that is, it is first determined what rate of production is desired and the type of product (with respect to calcium content) which it is desired to produce at this rate. For these values, there exists in each case, presuming a fixed reactor volume and predetermined temperature of operation, a corresponding residence time of the glycol ether in the fixed carbide bed, and a corresponding amount of excess carbide which must be placed in the fixed bed. In general, to achieve an economically feasible reaction rate, at least five times the amount of carbide which will react with the ether during the calculated residence time should be utilized in the bed.

After the required amount of calcium carbide to achieve the desired degree of conversion at the desired rate of glycol ether flow through the reaction vessel 10 has been placed on the screen 20, the glycol ether is continuously introduced to the vessel at this rate through the inlet 30. Simultaneously with the admission of the glycol ether through the inlet 30, the stirrer 22 is started and is revolved slowly, for example, at about 40 revolutions per minute. Flow through the product discharge conduit 18 is initially cut off or restricted by the liquid level controller 39 until the level of the liquid glycol ether in the reaction vessel 10 reaches about the level of the solid carbide in the fixed bed. At this time, the discharge conduit 38 is opened to permit product in the form of a slurry to be discharged from the reaction vessel at substantially the same rate as that at which the glycol ether is introduced to the vessel via the inlet 30. Also, at this time, calcium carbide is continuously introduced through the inlet 33 at a rate which is sufficient to make up carbide from the fixed bed as it is consumed in the reaction.

As previously indicated, though the reaction is exothermic and proceeds easily at atmospheric pressure at a a temperature of about 260° F., the reaction rate is directly proportional to the temperature at which the reaction is carried out. Thus, to obtain the desired degree of glycol conversion at the glycol flow rate and carbide excess values adapted, the temperature of the bed must be maintained at a value sufficiently high to achieve the required conversion at the anticipated rate. In general, the highest temperature economically attainable should be utilized. To this end, a suitable pre-heater 33 may be placed in the glycol ether inlet 30. Also, steam may be circulated between the walls of the conical portion 12 to assist in starting the reaction. However, after the reaction is well under way, cooling water should be circulated between the walls of the conical portion 12 to avoid cavitating the pump 34.

The stream of glycol ether-product solution which is discharged from the reaction vessel 10 through the discharge conduit 18 is split and the major portion of the product stream is recycled via the conduit 36 to the reaction vessel 10 at a point just below the screen 20. This recirculation of product increases the volume of liquid discharged from the reaction vessel and prevents clogging or plugging of the outlet by accumulation of calcium oxide. Upon commencement of the recirculation, the rate of product discharge through the conduit 18 should be increased so that the net make of product passed on subsequently to the filter (not shown) through conduit 38 is equal to the total rate of addition of reactants to the reactor. Stated differently, the rates of reactant introduction and net product discharge should be equalized so that the level of liquid in the reaction vessel stays substantially even with the upper surface of the fixed bed of carbide at all times. The acetylene gas generated in the reaction is vented through conduit 42 and passed to a suitable storage facility.

The process of the invention may be better understood by considering the following example of the process as it has been utilized in the production of calcium methoxy ethanolate.

A reaction vessel of the type shown in the accompanying drawings and having an inside diameter (at the cylindrical portion) of 4.5 feet and a height of 4.0 feet was utilized in the process. 2-methoxyethanol (methyl Cellosolve) was fed into the reaction vessel at the top thereof at a rate of 3 gallons per minute and a temperature of 40° F. This rate of feed was calculated to yield a solution of product in ether in which the total calcium content was about 8 percent. Two hundred sixty pounds of calcium carbide per hour was simultaneously fed into the top of the reactor in order to make up a corresponding amount of carbide from the bed which was calculated would be required to yield the 8 percent calcium product solution. The stirrer was rotated at about 30 revolutions per minute and the calcium carbide employed had an average particle size of about $\frac{1}{4}$ inch by $\frac{1}{12}$ inch.

At these rates of admission of the reactants into the specified reaction vessel, it could be estimated from known data that the liquid methyl Cellosolve would contact the fixed bed of carbide on the screen over a period of about 15 or 20 minutes if the bed contained about 10 theories of carbide—that is, an amount of carbide equal to 10 times the amount which would react stoichiometrically with a desired portion of the glycol ether entering the volume of reactor space occupied by this amount of carbide in this 15 or 20 minute period of time. In other words, with a given reactant flow rate (and a corresponding net product discharge rate) and a known reaction vessel size, the amount of carbide which should be used in the fixed bed to obtain the desired degree of conversion to product of the inflowing glycol ether can be estimated, using as a basis for such estimate, the amount of excess carbide required to convert a substantially equal amount of glycol ether reactant to product within a given reaction time when the reaction is carried out as a batch process. After placing the estimated amount of carbide in the bed, either the reactant flow rate, or the amount of carbide in the bed, or the temperature may be adjusted to obtain the desired degree of conversion of the glycol ether to product.

In the actual run made, it was found that, at the specified rate of introduction of the glycol ether (3 gallons per minute), 2000 pounds of carbide placed on the screen in the fixed bed resulted in the conversion of about 40 percent of the glycol ether to product, so that a solution of product in the ether containing a total calcium content of about 8 percent was produced. This amount of carbide produced a fixed bed which extended to about 20 inches above the screen and occupied a volume of 75 gallons. The liquid glycol ether was permitted to attain a level about 4 inches above the carbide bed and was then maintained at this level by removing product from the reaction vessel at a rate substantially equivalent to the rate of admission of the reactants. The residence time of the glycol ether in contact with the fixed bed was about 25 minutes. The 2000 pounds of carbide in the fixed bed therefore was about seven times the amount entering into reaction with 40 percent of the glycol ether flowing through the bed. The explanation for the error of the original estimate (10 times the amount) could be explained by the fact that the temperature in the reaction zone (the fixed bed of carbide) was 175° F., as opposed to the 220° F. temperature which was utilized in small scale batch processes which were carried out in a reaction time of 15 to 20 minutes and which were used as a basis for the estimate. If the methyl Cellosolve were preheated sufficiently to permit the reaction to proceed at about 220° F., the flow rate of the reactants could then be increased so that the 2000 pounds of carbide would actually be equivalent to 10 theories without reduction in the degree of conversion. In other words, the residence time of the glycol ether in contact with the fixed bed of carbide could be reduced to the estimated 15 to 20 minutes by increasing the temperature, and simultaneously increasing the rate of introduction of reactants and removal of product.

From the foregoing description of the invention, it will be apparent that the present invention provides a method and apparatus for more efficiently producing calcium alkoxy alcoholates by reacting a glycol ether with calcium carbide. Although a specific embodiment of the apparatus and certain details of the process have been hereinbefore described by way of example, it will be understood that modifications and innovations may be made with respect to the described embodiments of both apparatus and process without departure from the basic principles underlying the invention. It is therefore my intention that the spirit and scope of the present invention be considered to include all such modifications and innovations except as they be necessarily excluded therefrom by the language of the appended claims or reasonable equivalents thereof.

I claim:
1. In the method of preparing calcium alkoxy alcoholates by reacting calcium carbide with a glycol ether selected from the group consisting of compounds having the structural formula $ROCH_2CH_2OH$ where R is an alkyl group containing from 1 to 6 carbon atoms, and compounds having the structural formula

$$R'OCH_2CH_2OCH_2CH_2OH$$

where R' is an alkyl group having from 1 to 4 carbon atoms, the improvement which comprises:
(a) continuously passing said glycol ether through a reaction zone containing an excess amount of calicum carbide over that which reacts with said ether during the residence time of said ether in said reaction zone;
(b) continuously introducing into said reaction zone an amount of carbide sufficient to maintain the excess of this reactant;
(c) agitating the contents of said reaction zone;
(d) removing reaction product from said reaction zone; and
(e) said method being characterized further in that
(1) the residence time is from about 5 to about 100 minutes;
(2) the amount of excess calcium carbide maintained in said reaction zone is from about 2 to about 10 theories;
(3) the temperature of the reaction zone is in the range of about 160° F. to about 260° F.; and
(4) the glycol ether is passed through the reaction zone at a rate such that between about 3.8 percent and 55.5 percent of the glycol ether is reacted with the carbide whereby an alcoholate product solution containing between 1.0 percent and 15.0 percent by weight of calcium is produced.

2. The method described in claim 1 werein the glycol ether is 2-methoxyethanol.

3. The method described in claim 1 wherein:
(a) the residence time is from about 15 to about 30 minutes;
(b) the amount of excess calcium carbide maintained in said reaction zone is from about 5 to about 10 theories; and
(c) the temperature of the reaction zone is in the range of about 200° F. to about 220° F.

4. The method described in claim 3 wherein the glycol ether is 2-methoxyethanol.

5. The method described in claim 1 wherein said glycol ether is passed through said reaction zone at a rate such that between about 26.3 percent by weight and 38.5 percent by weight of the glycol ether is reacted with the carbide whereby an alcoholate product solution containing between 7 percent and 10 percent by weight of calcium is obtained.

6. The method described in claim 5 wherein:
(a) the residence time is from about 15 to about 30 minutes;
(b) the amount of excess calcium carbide maintained in said reaction zone is from about 5 to about 10 theories; and
(c) the temperature of the reaction zone is in the range of about 200° F. to about 220° F.

7. The method described in claim 6 wherein the glycol ether is 2-methoxyethanol.

References Cited by the Examiner
UNITED STATES PATENTS

| | | | |
|---|---|---|---|
| 628,378 | 7/1899 | Wymonde | 210—219 |
| 2,341,565 | 2/1944 | Lyman et al. | 260—632 X |
| 2,451,945 | 10/1948 | Hanford | 260—632 |
| 2,600,871 | 6/1952 | Helwig | 23—285 |
| 2,618,534 | 11/1952 | Mrstik | 23—285 |
| 2,978,514 | 4/1961 | Poynton | 260—615 |
| 3,009,964 | 11/1961 | Russell | 260—632 |
| 3,020,316 | 2/1962 | Thomas et al. | 260—615 |

LEON ZITVER, Primary Examiner.

B. HELFIN, H. T. MARS, Assistant Examiners.